(12) United States Patent
Goria et al.

(10) Patent No.: US 11,019,577 B2
(45) Date of Patent: May 25, 2021

(54) METHOD AND SYSTEM FOR DYNAMICALLY VARYING REFERENCE SIGNALS' POWER IN A MOBILE RADIO NETWORK

(71) Applicant: TELECOM ITALIA S.p.A., Milan (IT)

(72) Inventors: Paolo Goria, Turin (IT); Sergio Barberis, Turin (IT); Giovanna Zarba, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 142 days.

(21) Appl. No.: 15/767,797

(22) PCT Filed: Mar. 7, 2016

(86) PCT No.: PCT/EP2016/054810
§ 371 (c)(1),
(2) Date: Apr. 12, 2018

(87) PCT Pub. No.: WO2017/071828
PCT Pub. Date: May 4, 2017

(65) Prior Publication Data
US 2018/0310258 A1  Oct. 25, 2018

(30) Foreign Application Priority Data
Oct. 30, 2015 (WO) ................ PCT/EP2015/075296

(51) Int. Cl.
*H04W 52/32* (2009.01)
*H04W 52/14* (2009.01)
(Continued)

(52) U.S. Cl.
CPC ......... *H04W 52/325* (2013.01); *H04L 5/0048* (2013.01); *H04W 24/02* (2013.01);
(Continued)

(58) Field of Classification Search
None
See application file for complete search history.

(56) References Cited

U.S. PATENT DOCUMENTS

| 2009/0247228 | A1 | 10/2009 | Yellin | |
| 2012/0058791 | A1* | 3/2012 | Bhattad | H04L 5/0016 455/509 |

(Continued)

FOREIGN PATENT DOCUMENTS

| WO | 2009/118635 A2 | 10/2009 |
| WO | 2014/070067 A1 | 5/2014 |

OTHER PUBLICATIONS

International Search Report dated May 25, 2016 in PCT/EP2016/054810 filed Mar. 7, 2016.
(Continued)

*Primary Examiner* — Shripal K Khajuria
(74) *Attorney, Agent, or Firm* — Oblon, McClelland, Maier & Neustadt, L.L.P.

(57) ABSTRACT

A method of dynamically varying a power of a Reference Signal irradiated by a radio base station of a radio mobile network includes having a network entity monitoring a performance indicator associated with an area. The radio base station provides communication services to User Equipment located in a respective area served by the radio base station. The performance indicator is indicative of a communication channel state within the area. The method also includes either increasing or decreasing the power of the Reference Signal in the area based on a current value of the performance indicator. Either increasing or decreasing the power of the Reference Signal in the area based on a current value of the performance indicator includes modifying a power parameter referred to power of signals transmitted by the radio base station.

22 Claims, 4 Drawing Sheets

(51) Int. Cl.
*H04W 76/18* (2018.01)
*H04L 5/00* (2006.01)
*H04W 24/02* (2009.01)
*H04W 36/04* (2009.01)

(52) U.S. Cl.
CPC ......... *H04W 52/143* (2013.01); *H04W 76/18* (2018.02); *H04W 36/04* (2013.01)

(56) References Cited

U.S. PATENT DOCUMENTS

| | | | |
|---|---|---|---|
| 2012/0188988 A1* | 7/2012 | Chung | H04L 5/0016 370/335 |
| 2013/0244604 A1 | 9/2013 | Yellin | |
| 2014/0126534 A1 | 5/2014 | Larsson et al. | |
| 2014/0177622 A1* | 6/2014 | Juncker | H04W 56/00 370/350 |
| 2014/0248901 A1* | 9/2014 | Johnsson | H04W 64/00 455/456.1 |
| 2015/0281017 A1* | 10/2015 | Sarkar | H04L 43/08 370/252 |
| 2015/0349933 A1* | 12/2015 | Davydov | H04W 52/16 375/219 |
| 2016/0007254 A1* | 1/2016 | Venkatraman | H04W 36/04 370/332 |
| 2016/0073412 A1 | 3/2016 | Larrson E et al. | |
| 2019/0014546 A1* | 1/2019 | Wu | H04W 52/243 |

OTHER PUBLICATIONS

European Office Action dated Oct. 4, 2019 in Patent Application No. 16 709 329.3, 3 pages.

\* cited by examiner

METHOD AND SYSTEM FOR DYNAMICALLY VARYING REFERENCE SIGNALS' POWER IN A MOBILE RADIO NETWORK

BACKGROUND OF THE INVENTION

Field of the Invention

The present invention relates to wireless or mobile radio networks. Particularly, the present invention relates to wireless or mobile radio networks featuring an automation technology designed for performing planning, configuration, management, optimization and healing of mobile radio networks at least partially in an automatic manner, generally referred to as Self-Organizing Networks (SON).

More particularly, the present invention relates to a method and system for dynamically varying reference signals' power in a mobile radio network.

Overview of the Related Art

Mobile radio network, for example mobile telephony networks such as Long Term Evolution (LTE) and LTE Advanced (LTE-A) mobile telephony networks, are moving towards an increasing complexity in order to provide users served by the mobile radio network with an increasing number of services and an exchange of data at increasing data rates.

In order to simplify the management complexity of such mobile radio networks, Self-Organizing Networks (SON) have been proposed in the art.

Radio mobile SONs are radio mobile networks adapted to configure and optimize the operation of hardware elements (e.g., radio base stations, relay nodes etc.) and of the whole operation of the radio mobile network automatically. A SON typically comprises three main functionalities: self-configuration, self-optimization and self-healing.

Self-configuration is a process in which newly deployed radio base stations or nodes (e.g., evolved node B—eNBs—in LTE and LTE-A networks) are configured by automatic installation procedures through which necessary basic configuration for operation in the radio mobile network are set in each radio base station.

Self-optimization is a process in which data obtained from measurements of performance indicators of User Equipment (UE, e.g. mobile terminals connected to the radio mobile network) and eNBs are used to automatically adjust the operation of the radio mobile network in order to achieve a given target (e.g., efficiency, performance, etc.). Preferably, performance indicators provide an indication of a communication channel state (i.e., provide information on the communication between UE and eNB). Examples of performance indicators are received power on a radio channel, user data throughput at MAC layer, received quality of a radio channel, etc.

Self-healing is a process in which failures in the radio mobile network are automatically detected and localized, and auto-correction (i.e., self-healing) mechanisms are applied for solving such failures.

For implementing SON functionalities, particularly self-optimization, selected performance indicators of the radio mobile network, also denoted as Key Performance Indicators—KPIs—are used.

For example, Reference Signals (RS) are usually exploited. Generally, radio base stations transmit RS that are received and exploited by the UE served by the radio mobile network to evaluate a radio link quality of the serving cell (i.e., a portion of a region covered by the mobile radio network and served by a radio base station) possibly by comparison with cell-specific relative thresholds.

RS may be used as a reference for the received power measurements necessary to support Radio Resource Control (RRC) procedures such as cell selection and reselection, handover and so on.

In LTE and LTE-A radio mobile networks typical cell-level RS are the so called 'Cell Reference Signals', or CRS.

CRS are received and used by the UE to estimate the channel state over the entire cell bandwidth; such an estimation is then transmitted back to the corresponding radio base station where it is analyzed for network management purposes.

CRS are usually radiated at constant power level over the cell by the corresponding radio base station. The CRS power level may be configured by selecting a specific value within a predefined set of possible options.

For example, the CRS power value may be chosen between a data value (i.e. corresponding to the signal power used for transmitting data) and a so-called boosted value which is 3 dB higher (i.e., with a double power level with respect to the default value).

Such data and boosted CRS power values are usually set during the network deployment and the same value is chosen for all the cells of the radio mobile network (in other words, all the cells are either set at the data value, or they are set at the boosted value). Such a CRS power level assignment is static, i.e. it does not change during the network operation.

Since the operational conditions are subject to change (e.g. due to traffic variation, interference variations and so on) the static CRS power configuration cannot guarantee optimal performance in any operation condition of such a time-varying scenario.

For example, CRS power levels having a high value compared to data power value lead to a higher radio coverage and to a better channel estimation but this cause an impairment on the throughput performance of the mobile radio network; particularly, in case of low traffic condition high-value CRS power levels may cause interference to UE communication through the radio mobile network.

Conversely, CRS power levels having a low value compared to data power value lead to power measurement based on such CRS having a limited reliability in case of high traffic condition within the radio mobile network.

In order to mitigate such drawbacks some expedients have been proposed in the art.

For example, US 2014/126534 discloses a method in a network node for enhancing a channel estimate based on a Dedicated Physical Control Channel, DPCCH, between a user node and the network node. The DPCCH has a first power. The network node receives the DPCCH. The first power of the DPCCH is boosted with additional power, resulting in a second power. The network node then obtains a channel estimate based on the DPCCH comprising the second power. As soon as said channel estimate is obtained, the network node removes the additional power from the DPCCH based channel estimate.

WO 2009/118635 discloses a base station forming part of a cellular communications system that includes a reference signal generator, a boost selector and a transmitter. The reference signal generator provides a dedicated reference signal to be transmitted over plural antennas to a dedicated user device. The boost selector selects a dedicated boost level specific for the dedicated reference signal and the transmitter transmits the dedicated reference signal boosted by its dedicated boost level to the user device. A user equipment device includes a receiver, a boost determiner and a data demodulator. The receiver receives a dedicated reference signal transmitted by a base station where the dedicated reference signal has been boosted by a dedicated boost level specific to the user device. The boost determiner determines the dedicated boost level and the data demodulator demodulates a data signal from the base station using the dedicated boost level and a channel estimation value.

In Ying Si Yadan Zheng; Shubo Ren; Jianjun Wu: "Downlink Reference Signal Design for LTE Compatible GEO Mobile Satellite System", Control Engineering and Communication Technology (ICCECT), 2012 International Conference 7-9 Dec. 2012 Pages: 833-838, it is described a LTE compatible multibeam satellite system where the downlink reference symbols are power boosted in order to improve the SNR (Signal to Noise Ratio). Furthermore, the following downlink reference signal (DL-RS) improvement technologies are mentioned: power boosting, re-transmit and combined receive scheme. Simulation results and performance analysis prove the effectiveness of the proposed DL-RS design.

In Davide Micheli, Massimo Barazzetta, Franco Moglie, and Valter Mariani Primiani: "Power Boosting and Compensation During OTA Testing of a Real 4G LTE Base Station in Reverberation Chamber", IEEE Transactions on Electromagnetic Compatibility Volume 57 pages 623-634 10 Jul. 2015, it is described the test of a fully operational 4G long-term evolution (LTE) base station in a reverberation chamber to analyze its performance in the presence of a multipath environment, typical of wireless and vehicular communications. Transmission quality parameters are measured ranging from the empty chamber situation (very rich multipath channel) to a very high loading condition to mitigate multipath. Both outdoor and indoor propagation are accounted for. A large attenuation is inserted between the transmitter and the antenna to reduce the signal received by the user to real-life values encountered in both outdoor and indoor environments. In these scenarios, operators may choose to transmit a constant power spectral density throughout all LTE spectrum, or to increase the energy (i.e., power boosting) of control channels at the expense of data channels in order to enforce transmission and provide better quality to the user, especially in poor radio conditions.

SUMMARY OF THE INVENTION

The Applicant has observed that, generally, method and systems known in the art provide unsatisfactory results, as they are not able to provide (or have a limited ability in providing) a management of a power associated with the plurality of RS transmitted by the radio base stations to the UE.

The Applicant has thus coped with the problem of devising a method and a system adapted to overcome the problems affecting the prior art solutions.

The Applicant has found that it is possible and useful to adjust the value of RS power with respect to data power value separately for each cell of the radio mobile network dynamically and in an automatic manner on the basis of information obtained by the analysis of at least one parameter already available in the radio mobile network for different management purposes.

Particularly, one aspect of the present invention proposes a method of dynamically varying a power of a Reference Signal irradiated by at least one radio base station of a radio mobile network, said radio base station providing communication services to User Equipment located in at least one respective area served by said radio base station. The method comprises having a network entity:

monitoring at least one performance indicator associated with the at least one area, said at least one performance indicator being indicative of a communication channel state within said at least one area, and either increasing or decreasing the power of the Reference Signal in said at least one area on the basis of a current value of said at least one performance indicator, wherein said either increasing or decreasing the power of the Reference Signal in said at least one area on the basis of a current value of said at least one performance indicator comprises modifying at least one power parameter referred to power of signals transmitted by said radio base station.

Preferred features of the present invention are set forth in the dependent claims.

In one embodiment of the invention, the communication channel state comprises at least one complex transfer function matrix preferably accounting for transmissions between one or more transmit antennas and one or more receive antennas of said radio base station and User Equipment located in the at least one respective area.

In one embodiment of the invention, the step of either increasing or decreasing the power of the Reference Signal in said at least one area on the basis of a current value of said at least one performance indicator comprises:

increasing the power of the Reference Signal in said at least one area if said current value of said at least one performance indicator is lower than a first threshold, or decreasing the power of the Reference Signal in said at least one area if said current value of said at least one performance indicator is greater than a second threshold.

In one embodiment of the invention, said at least one performance indicator comprises a first and a second performance indicators. Preferably, the step of either increasing or decreasing the power of the Reference Signal in said at least one area comprises:

increasing the power of the Reference Signal in said at least one area if the current value of said first performance indicator is lower than a first threshold, or decreasing the power of the Reference Signal in said at least one area if the current value of said first performance indicator is greater than a second threshold and the current value of said second performance indicator is equal to or higher than a third threshold.

In one embodiment of the invention, said modifying at least one power parameter referred to power of signals transmitted by said radio base station comprises:

modifying a power associated with Orthogonal Frequency-Division Multiplexing symbols transmitted from said at least one radio base station to said User Equipment.

In one embodiment of the invention, said modifying a power associated with Orthogonal Frequency-Division Multiplexing symbols transmitted from said at least one radio base station to said User Equipment comprises modifying at least one between parameters $P_A$ and $P_B$ defined by the 3GPP standard.

In one embodiment of the invention, said increasing the power of the Reference Signal in said at least one area if said current value of said at least one performance indicator is lower than a first threshold comprises:

modifying at least one between parameters $P_A$ and $P_B$ from a respective first value to a respective second value, the second value being preferably lower than the first value in case of parameter $P_A$.

In one embodiment of the invention, said decreasing the power of the Reference Signal in said at least one area if said current value of said at least one performance indicator is greater than a second threshold comprises:

modifying at least one between parameters $P_A$ and $P_B$ from a respective third value to a respective fourth value, the fourth value being preferably higher than the third value in case of parameter $P_A$.

In one embodiment of the invention, said modifying at least one between parameters $P_A$ and $P_B$ from a respective first value to a respective second value comprises:

modifying the parameters $P_A$ and $P_B$ from base values, preferably equal to $P_{A|base}=0$ dB and $P_{B|base}=0$ (or 1), to boosted values, preferably equal to $P_{A|boost}=-3$ dB and $P_{B|boost}=1$.

In one embodiment of the invention, said modifying at least one between parameters $P_A$ and $P_B$ from a respective third value to a respective fourth value, the fourth value being preferably higher than the third value comprises:

modifying the parameters $P_A$ and $P_B$ from boosted values, preferably equal to $P_{A|boost}=-3$ dB and $P_{B|boost}=1$, to base values, preferably equal to $P_{A|base}=0$ dB and $P_{B|base}=0$ (or 1).

In one embodiment of the invention, for said parameter $P_A$ said first value, said second value, said third value, said fourth value are selected among 3 dB, 2 dB, 1 dB, 0 dB, −1.77 dB, −3 dB, −4.77 dB and −6 dB, and, preferably, for said parameter $P_B$ said first value, said second value, said third value, said fourth value are selected among 0, 1, 2 and 3.

In one embodiment of the invention, the method further comprises determining a percentage of decrease of said current value of said at least one performance indicator below the first threshold. Said modifying at least one between parameters $P_A$ and $P_B$ preferably comprises modifying at least one between parameters $P_A$ and $P_B$ on the basis of said percentage of decrease.

In one embodiment of the invention, the method further comprises determining a percentage of increase of said current value of said at least one performance indicator above the second threshold. Said modifying at least one between parameters $P_A$ and $P_B$ preferably comprises modifying at least one between parameters $P_A$ and $P_B$ on the basis of said percentage of increase.

In one embodiment of the invention, the method further comprises adjusting at least one cell reselection parameter referred to said at least one area for compensating a variation of a geographic extension of said at least one area provoked by said either increasing or decreasing the power of the Reference Signal in said at least one area.

In one embodiment of the invention, said adjusting at least one cell reselection parameter referred to said at least one area comprises adjusting at least one among:

parameter Qhyst;
parameter Qoffsets,n, and
parameter cellIndividualOffset which are defined by the 3GPP standard.

In one embodiment of the invention, said adjusting comprises, when the power of the Reference Signal is increased, at least one among:

decreasing parameter Qhyst of the same amount of increase of the power of the Reference Signal;
increasing parameter Qoffsets,n of the same amount of increase of the power of the Reference Signal, and
decreasing parameter cellIndividualOffset of the same amount of increase of the power of the Reference Signal.

Additionally or alternatively, said adjusting comprises, when the power of the Reference Signal is decreased, at least one among:

increasing parameter Qhyst of the same amount of increase of the power of the Reference Signal;
decreasing parameter Qoffsets,n of the same amount of increase of the power of the Reference Signal, and
increasing parameter cellIndividualOffset of the same amount of increase of the power of the Reference Signal.

In one embodiment of the invention, said at least one performance indicator associated with the at least one area comprises a Reference Signal Received Quality measurement.

In one embodiment of the invention, said first and second thresholds are indicative, respectively, of minimum and maximum admitted qualities of Reference Signal received by the User Equipment and transmitted from said radio base station.

In one embodiment of the invention, said first and second performance indicators associated with the at least one area comprise a Reference Signal Received Quality measurement and a Reference Signal Received Power measurement, respectively.

In one embodiment of the invention, said first and second thresholds are indicative, respectively, of minimum and maximum admitted qualities of Reference Signal received by the User Equipment and transmitted from said radio base station. Said third threshold is preferably indicative of a satisfactory power level of Reference Signal received by the User Equipment and transmitted from said radio base station.

Another aspect of the present invention proposes a system for dynamically varying a power of a Reference Signal irradiated by at least one radio base station of a radio mobile network, said radio base station providing communication services to User Equipment located in at least one respective area served by said radio base station. The system comprises one or more network elements implementing a software program product configured for implementing the method of above.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
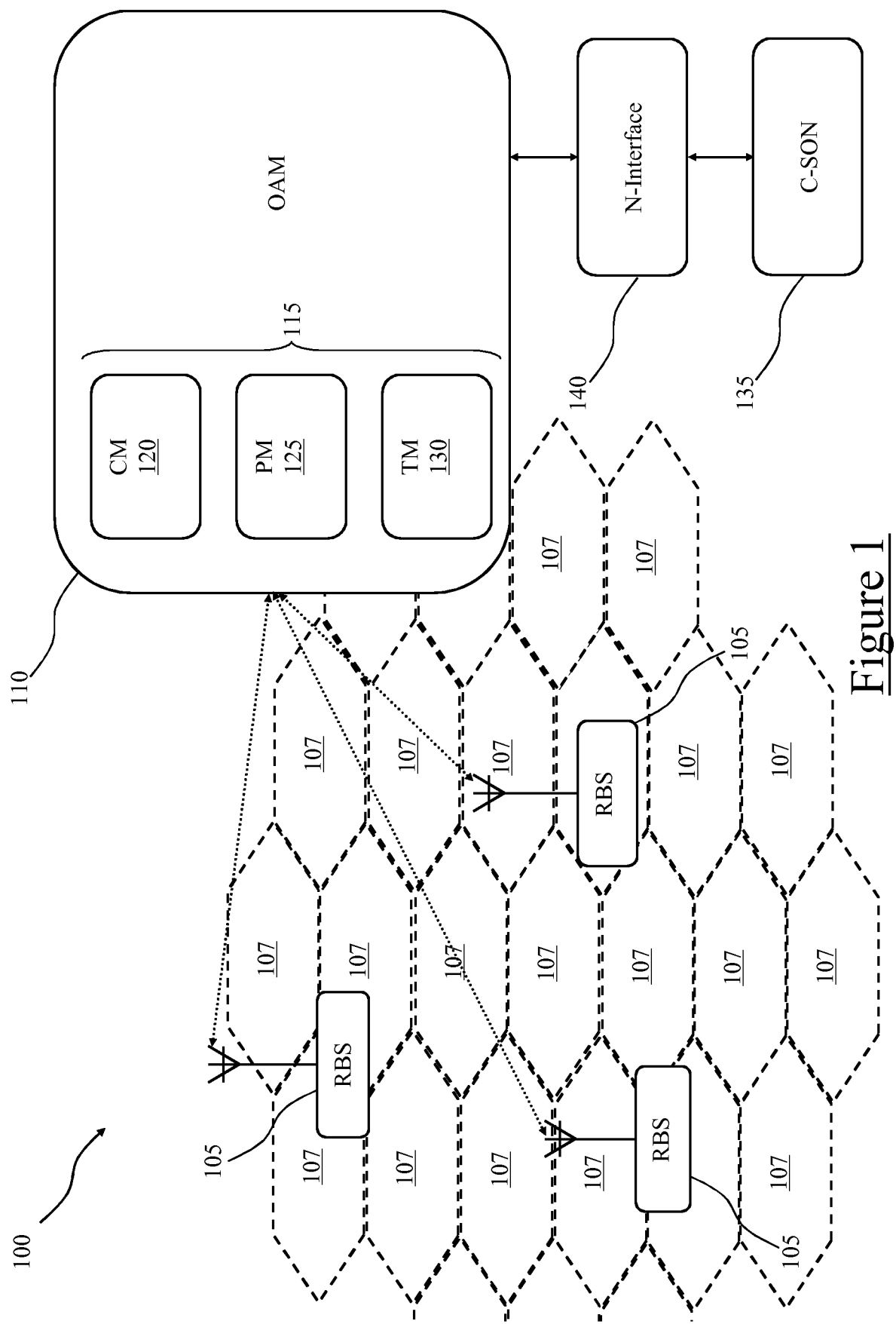
FIG. 1 is a schematic diagram of a first example of radio mobile network in which an embodiment according to the present invention may be employed.

With reference to the drawings, FIG. 1 is a schematic diagram of a first example of radio mobile network 100, in which an embodiment according to the present invention may be employed.

The radio mobile network 100 comprises a plurality of access network entities or Network Elements, such as for example radio base stations 105, e.g., evolved Node B, or eNB in Long Term Evolution (LTE)/Long Term Evolution-Advanced (LTE-A) mobile networks. Each radio base station 105 is configured for managing communication of (i.e., for serving) User Equipment, or UE (not shown), comprised within respective one or more covered areas, or cells 107.

The operation of radio base stations 105 is monitored and managed by Network Element Managers, i.e. management network entities of the radio mobile network 100, such as for example Operation, Administration and Management systems, or OAM systems 110 (conceptually depicted as a single block as shown in FIG. 1).

Advantageously, the OAM system 110 comprises an Operations Support System, or OSS 115 that comprises (preferably, although not limitatively, software) entities configured for automatically managing the operation of the radio base stations 105.

For example, the OSS 115 generally comprises three different functionalities. A first functionality is a Configuration Manager, or CM 120, which is configured for modifying operational parameters of the radio base stations 105 in order to achieve an efficient operation thereof. A second functionality is a Performance Manager, or PM 125, which is configured for monitoring the radio mobile network 100 operation and providing Key Performance Indicators, or KPI, thereof referred to the operation of the radio base stations 105. A third functionality is a Trace Manager, or TM 130, which is configured for analyzing the exchange of user and control data between the radio base stations 105 and the UE, including also internal events of radio base stations 105, e.g. reasons for connection release, failures, etc.

The radio mobile network 100 is organized with a 'so-called' Centralized Self-Organizing Network functionality, or C-SON.

As described in Seppo Hamalainen, Henning Sanneck, Cinzia Sartori: "LTE Self-Organising Networks (SON): Network Management Automation for Operational Efficiency", pages 3-6 Wiley 2011 and in Eiko Seidel et al.: "Self-Organizing Networks (SON) in 3GPP Long Term Evolution", Nomor Research GmbH, Munich, Germany 2008 (retrieved at: http://nomor.de/uploads/gc/TQ/gcTQfDWApo9osPfQwQoBzw/SelfOrganisingNetworksInLTE_2008-05.pdf), SONs are radio mobile networks adapted to configure and optimizing the operation of hardware elements (e.g., radio base stations, relay nodes etc.) and the whole operation of the radio mobile network automatically. A SON typically comprise three main functionalities: self-configuration, self-optimization and self-healing.

Self-configuration is a process in which newly deployed radio base stations or nodes (e.g., evolved node B—eNBs—in LTE networks) are configured by automatic installation procedures through which necessary basic configuration for operation in the radio mobile network are set in each radio base station.

Self-optimization is a process in which data obtained from measurements of operating parameters of User Equipment (UE, e.g. mobile terminals connected to the radio mobile network) and eNB are used to automatically adjust the operation of the radio mobile network in order to achieve a better efficiency.

Self-healing is a process in which failures in the radio mobile network are automatically detected and localized, and auto-correction (i.e., self-healing) mechanisms are applied for solving such failures.

In case of C-SON, such as the radio mobile network 100, the processes (e.g., implemented as algorithms) are preferably implemented and executed in a centralized network entity, such as for example a centralized node 135.

Even more preferably the centralized node 135 is operatively connected to Network Element Managers, i.e. OAM systems 110, through an appropriate interface; e.g., the centralized node 135 may be connected to OAM systems 110 by means of a so called Northbound interface, or N-interface 140.

Figure 2:
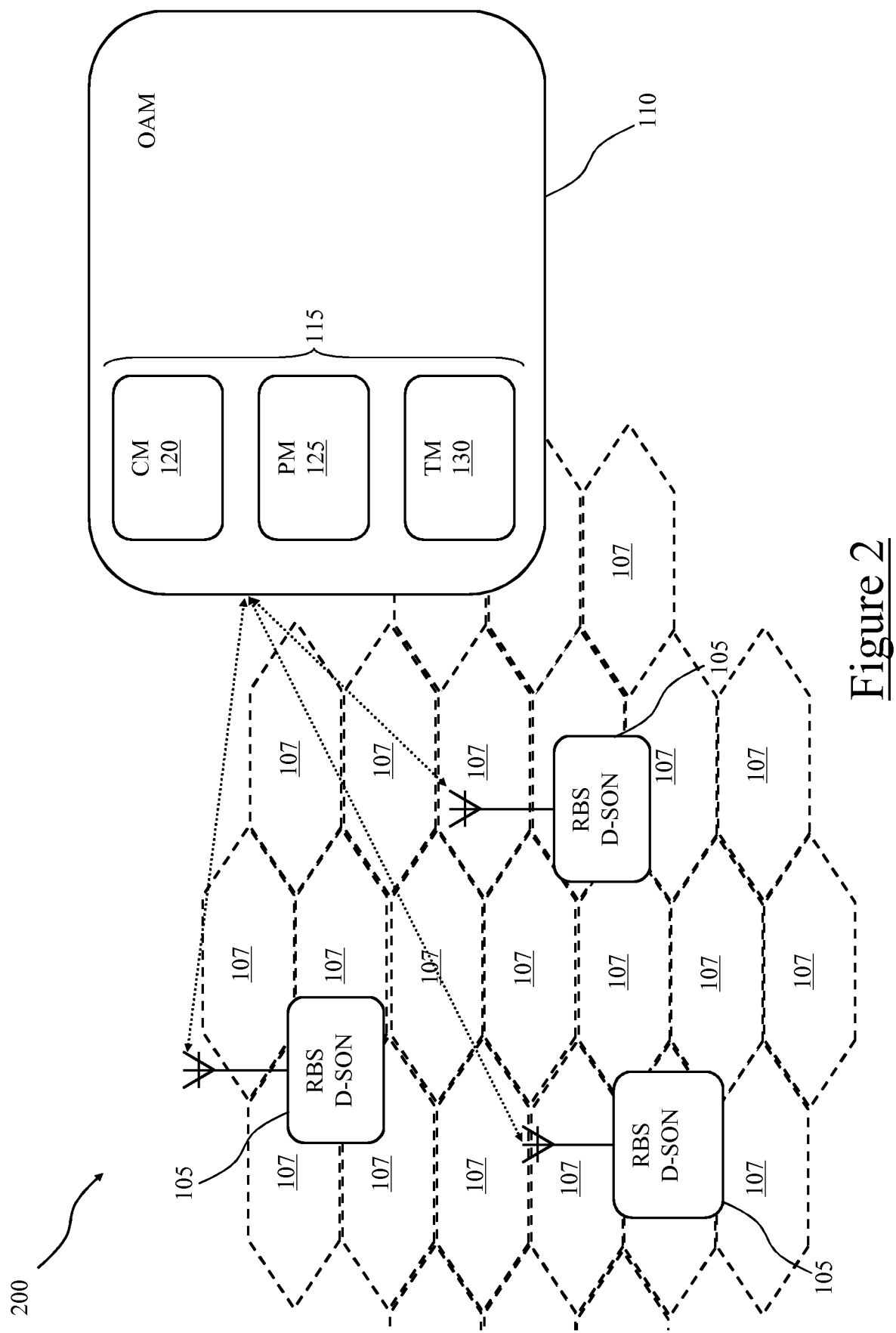
FIG. 2 is a schematic diagram of a second example of radio mobile network in which an embodiment according to the present invention may be employed.

FIG. 2 is a schematic diagram of a second example of radio mobile network 200 in which another embodiment according to the present invention may be employed.

The radio mobile network 200—wherein elements similar to the elements of the radio mobile network 100 are denoted by similar numeral references and their description is not repeated for the sake of conciseness—substantially differs from the radio mobile network 100 in being organized with Distributed Self-Organizing Network functionalities, or D-SON, rather than as a C-SON.

In case of D-SON, the processes (e.g., implemented as algorithms) are implemented and executed in each one Network Element, e.g. in each one of the radio base stations 105 of the radio mobile network 200.

In addition, also Hybrid SON, or H-SON, are known in which some of the processes (e.g., implemented as algorithms) are implemented and executed in each one of the radio base stations, while some other processes are implemented and executed in a centralized node, similar to the centralized node 135 of the radio mobile network 100.

According to one embodiment of the invention, the SON functionalities, i.e. the C-SON within radio mobile network 100 and/or the D-SON within radio mobile network 200, are configured for dynamically varying a power of Reference Signals, or RS, generated by the radio base stations 105, in order to reduce downlink interference and thus improving communications over the radio mobile network 100 and/or the radio mobile network 200 (particularly in terms of UE throughput, i.e. flow of binary information).

Indeed, the radio base stations 105 transmit a set of common RS that are exploited by the UE during normal operation. As known, those RS may be used as a reference for performing power measurements necessary to support Radio Resource Control (RRC), cell selection and reselection, handover and similar procedures commonly performed during UE—radio base stations 105 interactions.

For example, in LTE/LTE-A radio mobile networks typical RS are transmitted on a cell-level basis and are thus denoted as Cell Reference Signals (CRS). CRS are RS that are received by the UE and used for estimating the channel state over the entire bandwidth provided by the radio base station 105 for communications over the corresponding cell. Communication channel state is a general term indicating the information describing characteristics of the radio channel, typically represented by a complex transfer function matrix accounting for transmissions between one or more transmit antennas and one or more receive antennas of respectively UE and radio base station 105.

In one embodiment of the invention, the method for dynamically varying a power of the RS is based upon one or more information indicative of the channel state, denoted as Key Performance Indicators—KPIs in the following. Thus, in one embodiment of the invention, the method for dynamically varying a power of the RS is based upon one or more KPIs, each one preferably carrying with it information about specific aspects of the channel state (such as quality of the channel, RS power, and/or signal strength, as detailed below when discussing exemplary embodiments of the invention). Even more preferably, the number and type of the considered KPIs are chosen such that the combination of the information about the specific aspects of the channel state carried with the KPIs is able to "describe" the overall channel state with the desired accuracy.

The KPI may comprise an information regarding a quality of the channel in each cell, such as for example a Reference Signal Received Quality, or RSRQ, which is a measurement accounting for a quality of RS received by the UE and transmitted from the radio base stations 105, i.e. in the so-called downlink. Additionally or alternatively, the KPI may comprise an information regarding the signal strength of the channel in each cell, such as for example a Reference Signal Received Power, or RSRP, which is a measurement accounting for a power level of RS received by the UE and transmitted from the radio base stations 105. Additionally or alternatively, the KPI may comprise an information regarding the total power level of the channel in each cell, such as for example a Received Signal Strength Indicator, or RSSI, which is a measurement that provides an indication about a total power received at the UE preferably including all interference and thermal noise experienced by the UE. Considering the exemplary KPIs described above, RSRQ is based on a ratio between RSRP and RSSI.

In one embodiment of the invention, the C-SON functionality within radio mobile network 100 and/or the D-SON functionalities within radio mobile network 200 are configured to monitor automatically, and preferably according to a predetermined time schedule (e.g., periodically or asynchronously), one or more KPI(s) of each one of the cells 107 served by the respective radio base stations 105 (the one or more monitored KPI(s) being the same or different, at least in part, for each one of the cells 107).

The values of the KPI(s) for the different cells 107 are compared with at least a respective first predetermined KPI threshold value and a respective second predetermined KPI threshold value.

For each KPI value that is found being lower than the respective first predetermined KPI threshold value, the RS power (i.e., a power at which the RS are irradiated by the respective radio base station 105) is increased with respect to data power (i.e., a power at which the data are irradiated by the respective radio base station 105) to a first predetermined RS power value (boosted RS power value), an operation also denoted as boosting, in the cell 107 to which said KPI value is associated.

Conversely, for each KPI value that is found being higher than the respective second predetermined KPI threshold value, the RS power is lowered with respect to data power to a second predetermined RS power value (de-boosted RS power value), an operation also denoted as de-boosting, in the cell 107 to which said KPI value is associated.

Figure 3:
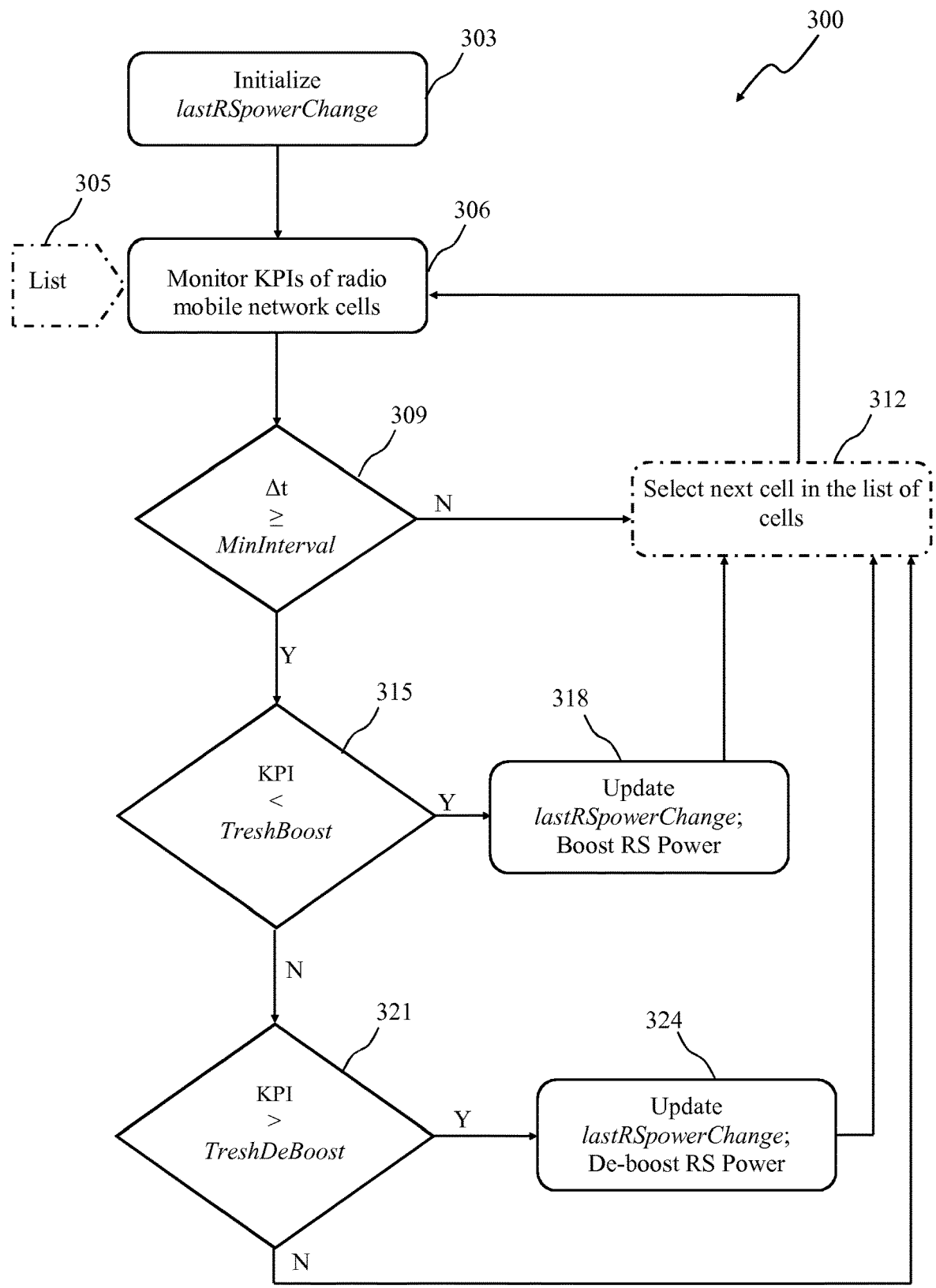
FIG. 3 is a schematic flowchart of an automated method for adjusting reference signals power according to an embodiment of the present invention.

With reference to FIG. 3, an automated method 300 for adjusting RS power according to an embodiment of the present invention is described. In the exemplary disclosed embodiment, only one KPI is considered.

It should be noted that the following method 300 may be applied to C-SON type functionalities, such as the C-SON functionalities provided within radio mobile network 100, or to D-SON type functionalities, such as the D-SON functionalities provided within radio mobile network 200, indifferently.

In case of C-SON, an algorithm implementing the method 300 is instantiated in a centralized node 135 and configured for monitoring continuously the KPIs referred to all the cells of the C-SON. Conversely, in case of D-SON, an algorithm implementing the method 300 is instantiated in each radio base station 105 and each instance of the algorithm is configured for monitoring the cells 107 managed by the corresponding radio base station 105.

In an initialization phase (block 303), an indication of a time at which a last change to the RS power occurred, e.g. denoted as lastRSpowerChange, is set to a null value and values of the RS powers are set to a data value, e.g. a de-boosted RS power level.

For each cell 107 of the radio mobile network 100 and/or the radio mobile network 200 the KPI is monitored (block 306).

Particularly, the method 300 for dynamically varying RS powers with respect to data power may be configured for monitoring the KPI of each cell 107 of the radio mobile network 100 and/or the radio mobile network 200 in parallel, or the method 300 may be configured for serially monitoring the cells 107 of the radio mobile network 100 and/or the radio mobile network 200, or the method 300 may envisage a mix of parallel and serial monitoring (e.g., for groups of cells).

Preferably, if the method 300 for dynamically varying RS powers with respect to data power is configured for serially monitoring the cells 107 of the radio mobile network 100 and/or the radio mobile network 200, a list 305 of the cells to be monitored is provided, and the cells 107 are monitored sequentially following the order of the list 305 of cells; e.g., from a first cell in the list 305 of cells to a last cell in the list 305 of cells, and after the monitoring of such a last cell in the list 305 of cells the monitoring may be re-iterated from the first cell in the list 305 of cells.

In one embodiment of the invention an average RSRQ is monitored as the KPI. Such average RSRQ is advantageously provided by the PM 125 of the OSS 115.

For example RSRQ may be obtained from corresponding available 'cumulative incremental counters'. According to 3GPP TS32.401, 'cumulative incremental counters', or simply counters, are triggered by the occurrence of a measured event and each Network Element maintains a running count of the event being counted. The counter is reset to a well-defined value (usually "0") at the beginning of a time interval or granularity period (wherein a granularity period corresponds to a frequency at which the measured events are counted; moreover, at the end of the each time interval a scheduled result report is usually generated and provided to Managing Network Elements of the radio mobile network 100 and/or the radio mobile network 200).

Preferably, it is checked (decision block 309) whether a time period $\Delta t$ starting from the lastRSpowerChange is equal to, or longer than, a minimum time interval, e.g. denoted as MinInterval, between two consecutive adjustments of the RS power value.

Preferably, the minimum time interval (MinInterval) is selected to have a time duration not too short, in order to reduce the impact on RS signalling and, on the other hand, it should not be too long in order to intercept significant changes that can suggest a power boosting/deboosting (i.e., an increase/decrease of RS power).

For example, the time duration of the minimum time interval (MinInterval) may be selected among values ranging from a granularity period (e.g., in the order of the minutes, such as for example 15 minutes) to several granularity periods (e.g., in the order of tens of granularity periods; i.e., in the order of hundreds of minutes, such as for example 1500 minutes).

In the negative case (exit branch N of decision block 309), i.e. the time period $\Delta t$ is shorter than the minimum interval (MinInterval), if the method 300 for dynamically varying RS powers with respect to data power is configured for monitoring the cells 107 of the radio mobile network 100 and/or 200 in parallel, the monitoring of the KPI is iterated returning to block 306. Conversely, if the method 300 for dynamically varying RS powers with respect to data power is configured for serially monitoring the cells 107 of the radio mobile network 100 and/or 200, a next cell is selected from the list 305 of cells (block 312) and the process returns to block 306 for monitoring the KPI of such a next cell.

In the affirmative case (exit branch Y of decision block 309), i.e. the time period Δt is longer than the minimum interval (MinInterval), it is allowed modifying the RS power if needed. Thus, it is first checked (decision block 315) whether the current KPI value is lower than a first KPI threshold value, also denoted as ThreshBoost. Preferably, the first KPI threshold value ThreshBoost is indicative of a minimum admitted quality of RS received by the UE and transmitted from the radio base stations 105 (and below which a boost of RS power is desirable, expected or required for improving the communications in the considered cell 107).

In the affirmative case (exit branch Y of decision block 315), i.e. the current KPI value is lower than the first KPI threshold value ThreshBoost, the RS power in the corresponding cell 107 is increased with respect to data power (i.e., the RS power is boosted; block 318) in order to optimize the performance with respect to the current channel state in the considered cell 107 and the indication of a time at which a last change to the RS power occurred (i.e., the lastRSpowerChange) associated with the corresponding cell 107 is updated at the current time instant.

Preferably, RS power in the cells 107 is increased with respect to data power by modifying at least one power parameter referred to a power of signals transmitted by the corresponding radio base stations 105.

In one embodiment of the invention, implemented in a LTE/LTE-A radio mobile network 100 and/or 200, at least one parameter referred to a power associated with Orthogonal Frequency-Division Multiplexing, or OFDM, symbols transmitted in downlink (i.e., from the base stations 105 to the UE) is adjusted in order to modify the ratio between RS power and data power to a desired value.

For example, at least one between parameters named $P_A$ and $P_B$ defined by the 3GPP standard (with particular reference to 3GPP TS 36.213, section 5.2 "Downlink power allocation") is exploited in order to modifying the ratio between transmitted RS power and transmitted data power.

It should be noted that changes to at least one between parameters $P_A$ and $P_B$ described above, modify the parameter referenceSignalPower defined by the 3GPP standard (with particular reference to 3GPP TS 36.213, section 5.2 "Downlink power allocation") that sets an actual RS power accordingly (as described in further detail in the following). Parameter $P_A$ is a ratio (measured in dB) between a power associated with data Resource Elements, or RE (i.e., time/frequency resources used to transport information in LTE), belonging to type A and the current power of RS.

Considering a typical set of seven symbols (the symbol being a pulse representing an integer number of bits) transmitted in a generic time slot (a basic transmission time interval in LTE/LTE-A) by a radio base station 105, RE belonging to type A are the RE located in one of such seven OFDM symbols that contains no RS (e.g., the 2nd to 4th and the 6th and 7th symbols of the sequence of seven symbols in a radio base station 105 with a single antenna port).

Particularly, parameter $P_A$ comprises eight allowed values, namely: 3 dB, 2 dB, 1 dB, 0 dB, −1.77 dB, −3 dB, −4.77 dB and −6 dB defined by the 3GPP standard (with particular reference to 3GPP TS 36.331, section 6.3.2 "Radio resource control information elements—PDSCH-Config"). Each one of the allowed values represents a certain ratio between power of data RE type A and power of RS.

Parameter $P_B$ is a ratio (a pure number) between the power of data RE belonging to type B (e.g. RE located in one of such seven OFDM symbols that contains RS but transmitting data and not RS) and the power of data RE belonging to type A.

Considering a typical set of seven symbols transmitted in a generic time slot by a radio base station 105, RE belonging to type B are the RE located in one of such seven OFDM symbols that contains RS (e.g., the 1st and the 5th symbols of the sequence of seven symbols in a radio base station 105 with a single antenna port).

Particularly, parameter $P_B$ comprises four allowed values, namely: 0, 1, 2 and 3. Each one of the allowed values represents a certain ratio between power of data RE type B and power of data RE type A, depending also on the number of transmitting antennas comprised in radio base station 105 as can be understood from the Table 5.2-1 of 3GPP TS 36.213.

Parameter referenceSignalPower indicates the power level of transmitted RS measured in dBm. Particularly, parameter referenceSignalPower comprises integer values in the range −60 to 50 dBm (as described in 3GPP TS 36.331, section 6.3.2 "Radio resource control information elements").

The actual value of parameter referenceSignalPower depends on the maximum transmitted power capability of the base station 105 and on the deployment configuration in terms of entire bandwidth (e.g., which determines a total number of available RE, such for example available physical resource blocks) provided by the radio base station 105.

Parameter referenceSignalPower is defined in 3GPP TS 36.213 (section 5.2 "Downlink power allocation") as the linear average over the power contributions (in [W]—Watts) of all RE that comprise RS within the entire bandwidth provided by the radio base station 105.

The actual transmitted powers of RS and data (and thus the corresponding boosted or deboosted condition) may be determined on the basis of the parameters $P_A$ and $P_B$ and the parameter referenceSignalPower.

Preferably, the at least one parameter which is adjusted is the parameter $P_A$. In one embodiment of the present invention, given an initial power for transmitted RS determined by parameter referenceSignalPower, the RS power is increased with respect to data power (i.e., boosted) by configuring the radio mobile network 100 and/or 200 in order to modify the values of parameters $P_A$ and $P_B$ from respective base values, e.g. $P_{A|base}=0$ dB and $P_{B|base}=0$ (or 1), corresponding to a de-boosted condition, to a boosted value, corresponding to a boosted condition, e.g. $P_{A|boost}=-3$ dB and $P_{B|boost}=1$.

In such an example, in the boosted condition the actual transmitted power of RS is defined by referenceSignalPower, the actual power of transmitted data related to RE Type A is given by referenceSignalPower −3 dB and the actual power of transmitted data related to RE Type B is given by referenceSignalPower −3 dB as well. In other words, by modifying the value of parameter $P_A$ the power of RE Type A is affected.

Afterwards, if the method 300 for dynamically varying RS powers with respect to data powers is configured for monitoring the cells of the radio mobile network 100 and/or 200 in parallel, the monitoring of the KPI is iterated returning to block 306. Conversely, if the method 300 for dynamically varying RS powers with respect to data powers is configured for serially monitoring the cells of the radio mobile network 100 and/or 200, a next cell to monitor is selected (at block 312 mentioned above) and the process returns to block 306 for monitoring the KPI of a next cell.

Back to the decision block 315, in the negative case (exit branch N of decision block 315), i.e. the KPI value is equal or higher than the first KPI threshold value ThreshBoost, the communications in the considered cell 107 would not be improved by boosting the RS power with respect to data power. It is then checked (decision block 321) whether the actual KPI value is higher than a second KPI threshold value, denoted as ThreshDeBoost. Preferably, the KPI values between the first ThreshBoost and second ThreshDeBoost KPI threshold values are indicative of a quality of RS received by the UE and transmitted from said radio base station 105 deemed satisfactory (or satisfactory KPI values), thus the second KPI threshold value ThreshDeBoost is preferably indicative of a maximum admitted quality of RS received by the UE and transmitted from said radio base station 105 (and above which a de-boost of RS power can reasonably be carried out without that the communications in the considered cell 107 are expected to be compromised, i.e. with the resulting quality of RS that is expected to fall within the satisfactory KPI values).

In the affirmative case (exit branch Y of decision block 321), i.e. the KPI value is higher than the second KPI threshold value ThreshDeBoost, the RS power in the considered cell 107 is lowered with respect to data power (i.e., the RS power is de-boosted; block 324) in order to optimizing the performance with respect to the current channel quality in the considered cell 107, and the indication of a time at which a last change to the RS power occurred (i.e., the lastRSpowerChange) associated with the considered cell 107 is updated at the current time instant.

Preferably, RS power in the cells 107 is lowered with respect to data power by modifying at least one power parameter referred to a power of signals transmitted by the corresponding radio base stations 105. Even more preferably, the at least one power parameter used for lowering the RS power with respect to data power is the same power parameter used for increasing it.

Again, in one embodiment of the invention, implemented in a LTE/LTE-A radio mobile network 100 and/or 200, at least one of the parameters $P_A$ and $P_B$ is adjusted in order to modify the RS power to a desired value with respect to data power.

As noted above, changes to at least one between parameters $P_A$ and $P_B$, affects the parameter referenceSignalPower that set the actual transmitted RS power and the actual transmitted data power.

Preferably, the at least parameter which is adjusted is the parameter $P_A$. In one embodiment of the present invention, given the transmitted power of RS referenceSignalPower, the RS power is lowered with respect to data power (i.e., de-boosted) by configuring the radio mobile network 100 and/or 200 in order to modify the values of Parameters $P_A$ and $P_B$ from respective boosted value, e.g. $P_{A|boost}$=−3 dB and $P_{B|boost}$=1 back to the base values, e.g. $P_{A|base}$=0 dB and $P_{B|base}$=0 (or 1).

In this example, in the de-boosted condition the actual transmitted power of RS is given by referenceSignalPower, the actual transmitted power of data related to RE Type A is given by referenceSignalPower, and the actual transmitted power of data related to RE Type B is given by referenceSignalPower in case of $P_{B|base}$=1 and is given by referenceSignalPower +1 dB in case of $P_{B|base}$=0 as can be understood from the Table 5.2-1 of 3GPP TS 36.213. In other words, by modifying the value of parameters $P_A$ and $P_B$ the power of both transmitted RE Type A and Type B is affected.

Back to the decision block 321, in the negative case (exit branch N of decision block 321), i.e. the KPI value is equal or lower than the second KPI threshold value ThreshDeBoost (i.e. it falls within the satisfactory KPI values), the RS power is considered to be already at an optimized value for a current channel state in the cell 107 (i.e. the communications in the considered cell 107 would be not improved by modifying the RS power) and no action is taken.

Thus, if the method 300 for dynamically varying RS powers with respect to data powers is configured for monitoring the cells of the radio mobile network 100 and/or 200 in parallel, the monitoring of the KPI is iterated returning to block 306. Conversely, if the method 300 for dynamically varying RS powers with respect to data powers is configured for serially monitoring the cells of the radio mobile network 100 and/or 200, a next cell to monitor is selected (at block 312 mentioned above) and the process returns to block 306 for monitoring the KPI of a next cell.

In one embodiment of the present invention, the algorithm is configured for automatically, and preferably according to a predetermined time schedule (e.g., periodically, continuously, or asynchronously), monitoring the KPI of each cell of the radio mobile network 100 and/or 200.

Particularly, if the method 300 for dynamically varying RS powers with respect to data powers is configured for monitoring the cells of the radio mobile network 100 and/or 200 in parallel, the monitoring of the KPI is reiterated (restarted) on all cells of the radio mobile network 100 and/or 200 once it has been completed (possibly, after an idle period of time).

Conversely, if the method 300 for dynamically varying RS powers with respect to data powers is configured for serially monitoring the cells of the radio mobile network 100 and/or 200, once a last cell in the list 305 of the cells has been monitored, the monitoring is re-iterated (restarted) from the first cell in the list 305 of the cells of the radio mobile network 100 or 200.

The algorithm implementing the method 300 for dynamically varying a power of RSs with respect to a power of data thus allows to adjust the RS power in each one of the cells 107 of the radio mobile network 100 and/or 200 independently from the other cells 107 thereof. In this way, the RS power may be adjusted according to the current effective conditions of each one of the cells 107 of the radio mobile network 100 and/or 200 leading to an overall improvement of the communications in the whole radio mobile network 100 and/or 200. In addition, the method 300 for dynamically varying a power of RS with respect to a power of data is implemented in a completely automated manner.

It should be noted that the algorithm implementing the method 300 for dynamically varying a power of RS with respect to a power of data may undergo several modification without departing from the scope of the present invention.

In one embodiment of the invention, a different information may be exploited as KPI instead of the RSRQ such for example an average downlink throughput.

In addition, in another embodiment of the invention a different statistical characterization may be exploited as KPI instead of average such for example a cumulative distribution.

Further, in another embodiment of the present invention, the first KPI threshold value ThreshBoost and the second KPI threshold value ThreshDeBoost may be defined as x-th percentiles of a selected cumulative distribution (such as for example the 90th percentile of the selected cumulative distribution).

In one embodiment of the invention, different settings of the parameters $P_A$ and/or $P_B$ may be used in case of boosting and de-boosting the RS power with respect to a data power in the cells 107 of the radio mobile network 100 and/or 200, e.g. $P_A=-1.77$ dB for boosting and $P_A=1$ dB for de-boosting, according to cell-specific and/or network-specific requirements (e.g., cells size, available power for downlink communications, number of antennas comprised in each radio base station 105, etc.).

In one embodiment of the invention, an incremental approach for applying boosting and de-boosting the RS power in the cells 107 of the radio mobile network 100 and/or 200 may be implemented.

In one embodiment of the present invention, the method for dynamically varying a power of RS with respect to a power of data may be applied only to a group of cells of the radio mobile network, subset of all the cells of the radio mobile network, or to just to one of the cells of the radio mobile network.

Preferably the algorithm is configured for modifying the RS power with a finer granularity with respect to the embodiment described above. This is a preferred option in this embodiment, but may be applied to other embodiments of the invention, as well.

Preferably, a plurality of boosting and/or de-boosting values may be provided by exploiting the plurality allowed values of at least one of the parameters $P_A$ and/or $P_B$.

For example, by considering the parameter $P_A$, four allowed values, namely: −6 dB, −4.77 dB, −3 dB, and −1.77 dB, may be used for boosting the RS power with respect to data power (denoted as $P_A$ boosting values in the following). In addition, by combining the three $P_A$ boosting values with the four allowed values, namely: 0, 1, 2 and 3, of the parameter $P_B$ it is possible to obtain up to sixteen (4×4=16) different corresponding boosting values that may be used for boosting the RS power.

Therefore, four to sixteen boosting values may be defined for boosting the RS power with respect to data power.

A plurality of boost KPI threshold values may be defined and each one may be associated with a corresponding boosting value defined for boosting the RSs power with respect to data power. The KPI is compared with each one of boost KPI threshold values (e.g. sequentially from a greatest boost KPI threshold value to a lowest boost KPI threshold value) and, in a similar manner to decision block 315 described above, if the KPI is lower than the boost KPI threshold value considered the RS power is adjusted by setting the corresponding boosting value (i.e. the combination of parameters $P_A$ and/or $P_B$ associated with the considered boost KPI threshold).

As a further alternative, a percentage of decrease of the KPI below a boost KPI threshold value could be evaluated. Accordingly, a corresponding boosting value for boosting the RS power with respect to data power could be selected on the basis of such evaluated percentage of decrease of the KPI below a boost KPI threshold value.

Similarly, by considering the parameter $P_A$, four allowed values, namely: 0 dB, 1 dB, 2 dB, and 3 dB, may be used for de-boosting the RS power with respect to data power (denoted as $P_A$ de-boosting values in the following). In addition, by combining the four $P_A$ de-boosting values with the four allowed values, namely: 0, 1, 2 and 3, of the parameter $P_B$ it is possible to obtain up to sixteen (4×4=16) different corresponding de-boosted RS power values.

Therefore, four (i.e., by varying only parameter $P_B$) to sixteen de-boosting values may for example be defined for de-boosting the RS power with respect to data power.

A plurality of de-boost KPI threshold values may be defined and each one associated with a corresponding de-boosting value defined for de-boosting the RS power with respect to data power. The KPI is compared with each one of de-boost KPI threshold values (e.g. sequentially from a greatest de-boost KPI threshold value to a lowest de-boost KPI threshold value) and, in a similar manner to decision block 321 described above, if the KPI is higher than the boost KPI threshold value considered the RS power is adjusted by setting the corresponding de-boosting values (i.e. the combination of parameters $P_A$ and/or $P_B$ associated with the considered de-boost KPI threshold).

As a further alternative, a percentage of increase of the KPI above a de-boost KPI threshold value could be evaluated. Accordingly, a corresponding de-boosting value for de-boosting the RS power with respect to data power could be selected on the basis of such evaluated percentage of increase of the KPI above a de-boost KPI threshold value.

It should be noted that, in the embodiment of the present invention just described, it is possible to reduce the RS power to de-boosted RS power values lower than the base values ($P_{A|base}=0$ dB and $P_{B|base}=0$).

The algorithm implementing the method for dynamically varying a power of RS with respect to a data power comprising such multiple boost/de-boost KPI thresholds allows to set RS power values finely tuned with the current channel state of each one of the cells 107 of the radio mobile network 100 and/or 200, with a subsequent more accurate optimization of the RS power values with respect to a two-threshold algorithm in each cell of the radio mobile network 100 and/or 200.

It should be noted that the method for dynamically varying a power of RS described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

It should be finally noted that the dynamic variation of a power of RS with respect to power of data may bring to a variation in a coverage—i.e., a geographic extension of the respective one or more covered areas, or cells 107 over which each radio base station 105 provide services to UE—of radio base stations 105 managed by the algorithm implementing the method for dynamically varying a power of RS with respect to a data power according to the present invention with respect to the initial condition and this coverage variation may then be perceived by the UE.

In an embodiment of the invention, the algorithm implementing the method for dynamically varying a power of RS with respect to a data power may comprise a step, just after steps 318 and 324, devised to compensate such coverage variation in order to prevent the UE from sensing a coverage variation, which could lead the UE to start an undesired cell reselection procedure.

In an embodiment, the invention may exploit parameters used for managing a cell reselection operation in the radio mobile network 100 and/or 200; for example, parameters named Qhyst and Qoffsets,n defined by the 3GPP standard (with particular reference to 3GPP TS 36.304, section 5.2.4.7 "Cell reselection parameters in system information broadcasts") and parameter named cellIndividualOffset defined by the 3GPP standard (with particular reference to 3GPP TS 36.331, section 6.3.5 "Measurement information elements") may be exploited.

Particularly, Qhyst specifies the hysteresis value for ranking criteria, while parameter Qoffsets,n specifies the offset between two cells 107 of the radio mobile network 100 and/or 200.

Parameter cellIndividualOffset defines cell individual offset applicable to a considered cell 107 of the radio mobile network 100 and/or 200.

In this embodiment, when the power of RS in a generic cell 107 is increased (i.e., switch to boosted condition) compared to previous settings, then parameter Qhyst referred to the affected generic cell 107 is decreased of the same amount of increase of the power of RS.

Conversely, parameter Qoffsets,n referred to the generic cell 107 is increased of the same amount of increase for any interactions of the generic cell 107 with network elements (e.g., other cells 107) of the whole radio mobile network 100.

Finally, parameter cellIndividualOffset referred to the generic cell 107 is decreased of the same amount of increase for any interactions of the generic cell 107 with network elements (e.g., other cells 107) of the whole radio mobile network 100.

Conversely, when the power of RS of a generic cell 107 is decreased compared to previous setting, then parameter Qhyst referred to the affected cell 107 is increased of the same amount of decrease of the power of RS.

Parameter Qoffsets,n referred to the generic cell 107 is decreased of the same amount of decrease for any interactions of the generic cell 107 with network elements (e.g., other cells 107) of the whole radio mobile network 100.

Finally, parameter cellIndividualOffset referred to the generic cell 107 is increased of the same amount of decrease for any interactions of the generic cell 107 with network elements (e.g., other cells 107) of all the whole radio mobile network 100. In addition, even though the embodiment of the method for dynamically varying a power of RS has been described with reference to a LET/LTE-A radio mobile network, other embodiments according to the present invention may be also implemented in radio mobile networks of different technology using RS.

As mentioned above, in another embodiment of the invention, the C-SON functionality within radio mobile network 100 and/or the D-SON functionalities within radio mobile network 200 are configured to monitor automatically, and preferably according to a predetermined time schedule (e.g., periodically or asynchronously), a plurality of KPIs of each one of the cells 107 served by the respective radio base stations 105.

An automated method 400 for adjusting RS power based on monitoring of a plurality of KPIs according to an embodiment of the present invention will be described here below with reference to FIG. 4, wherein same or similar blocks discussed above in connection with FIG. 3 will not be explained again for the sake of conciseness.

Similarly to the method 300, the method 400 may be applied to C-SON type functionalities, such as the C-SON functionalities provided within radio mobile network 100, or to D-SON type functionalities, such as the D-SON functionalities provided within radio mobile network 200, indifferently.

As discussed above, in case of C-SON, an algorithm implementing the method 400 is instantiated in a centralized node 135 and configured for monitoring continuously the KPIs referred to all the cells of the C-SON. Conversely, in case of D-SON, an algorithm implementing the method 400 is instantiated in each radio base station 105 and each instance of the algorithm is configured for monitoring the cells 107 managed by the corresponding radio base station 105.

In the method 400, the values of each of the monitored KPIs for the different cells 107 are compared with corresponding predetermined KPI threshold values and the decision to increase or decrease RS power (i.e., a power at which the RS are irradiated by the respective radio base station 105) with respect to data power (i.e., a power at which the data are irradiated by the respective radio base station 105) to predetermined RS power values (e.g., boosted RS power value or deboosted RS power value), depends on the overall comparison of KPIs against the corresponding predetermined threshold values.

For example, in the exemplary considered embodiment of the method 400, two different KPIs are considered. According to the preferred, but not limiting embodiment herein considered, the RSRP and RSRQ are considered as KPIs to be monitored in each cell 107. Even more preferably, as herein assumed by way of example only, the statistical cumulative distribution of RSRP and the statistical cumulative distribution of RSRQ are the considered as the monitored KPIs. Such cumulative distribution of RSRP and cumulative distribution of RSRQ are advantageously provided by the PM 125 of the OSS 115. For example both RSRP and RSRQ may be obtained from corresponding available cumulative incremental counters as described above.

Figure 4:
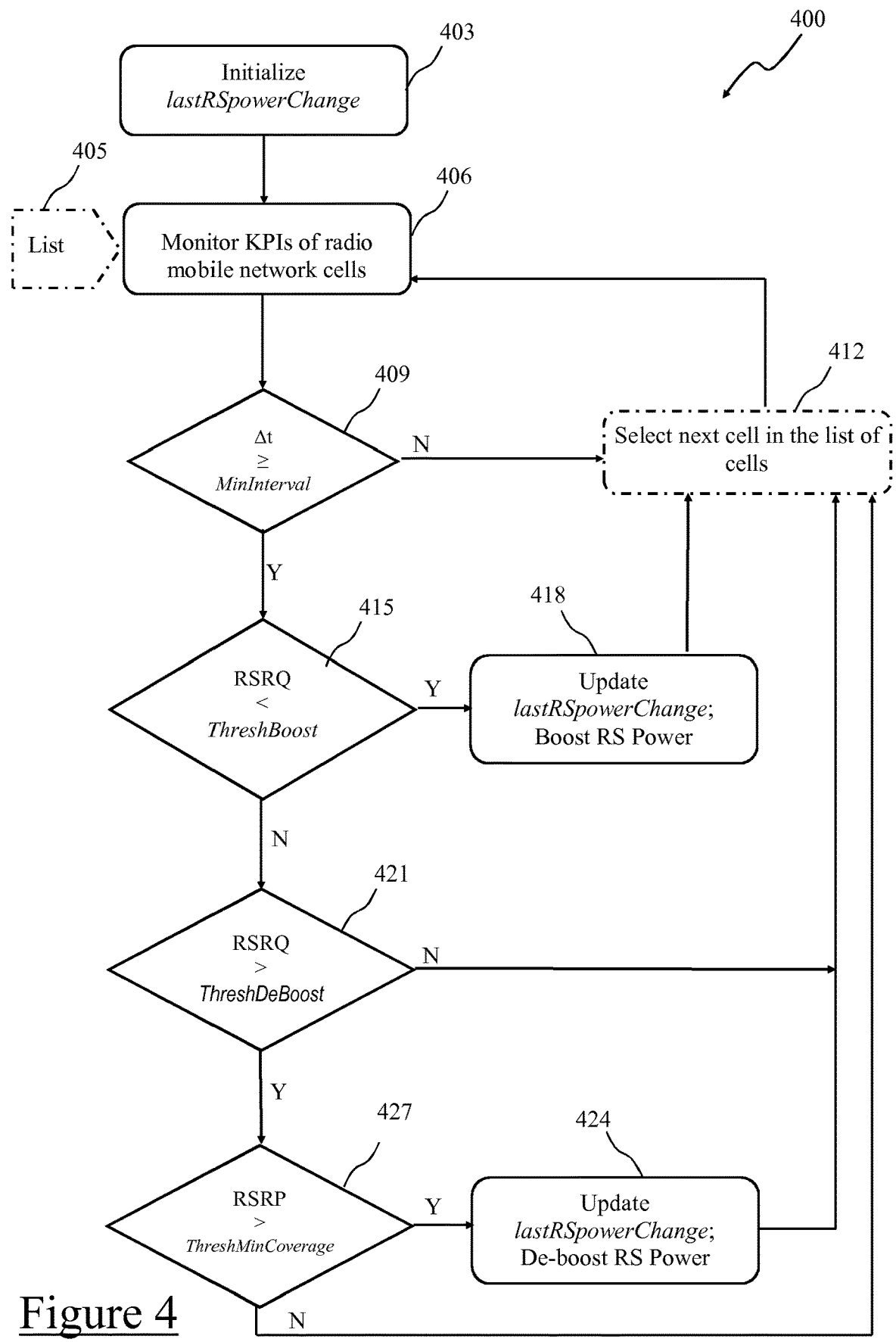
FIG. 4 is a schematic flowchart of an automated method for adjusting reference signals power according to another embodiment of the present invention.

With reference to the activity diagram of FIG. 4, in an initialization phase (block 403), an indication of a time at which a last change to the RS power occurred, denoted as lastRSpowerChange (as in the previous embodiment), is set to a null value and values of the RS powers are set to a data value, e.g. a de-boosted RS power level.

For each cell 107 of the radio mobile network 100 and/or the radio mobile network 200 the (two different) KPIs (i.e., RSRP and RSRQ) are monitored (block 406).

Similarly to the above, without losing generality, the method 400 for dynamically varying RS powers with respect to data power may be configured for monitoring the KPIs of each cell 107 of the radio mobile network 100 and/or the radio mobile network 200 in parallel, or the method 400 may be configured for serially monitoring the cells 107 of the radio mobile network 100 and/or the radio mobile network 200, or the method 400 may envisage a mix of parallel and serial monitoring (e.g., for groups of cells).

Preferably, if the method 400 for dynamically varying RS powers with respect to data power is configured for serially monitoring the cells 107 of the radio mobile network 100 and/or the radio mobile network 200, a list 405 of the cells to be monitored is provided, and the cells 107 are monitored sequentially following the order of the list 405 of cells; e.g., from a first cell in the list 405 of cells to a last cell in the list 405 of cells, and after the monitoring of such a last cell in the list 405 of cells the monitoring may be re-iterated from the first cell in the list 405 of cells.

Then, similarly to the method 300, it is checked (decision block 409) whether the time period $\Delta t$ starting from the lastRSpowerChange is equal to, or longer than the minimum time interval (MinInterval) between two consecutive adjustments of the RS power value—with the minimum time interval (MinInterval) that is preferably selected, as discussed above, to have a time duration not too short, in order to reduce the impact on RS signaling and, on the other hand, it should not be too long in order to intercept significant changes that can suggest a power boosting/deboosting (i.e., an increase/decrease of RS power).

In the negative case (exit branch N of decision block 409), i.e. the time period Δt is shorter than the minimum interval (MinInterval), if the method 400 for dynamically varying RS powers with respect to data power is configured for monitoring the cells 107 of the radio mobile network 100 and/or 200 in parallel, the monitoring of the KPIs is iterated returning to block 406. Conversely, if the method 400 for dynamically varying RS powers with respect to data power is configured for serially monitoring the cells 107 of the radio mobile network 100 and/or 200, a next cell is selected from the list 405 of cells (block 412) and the process returns to block 406 for monitoring the KPIs of such a next cell.

In the affirmative case (exit branch Y of decision block 409), i.e. the time period Δt is longer than the minimum interval (MinInterval), it is allowed modifying the RS power if needed.

In this case, a check of the first KPI (e.g., the RSRQ) is performed (decision block 415), i.e. it is first checked whether a selected RSRQ percentile value extracted from statistics (e.g. 50% percentile) is lower than a first RSRQ threshold value. The first RSRQ threshold value will be denoted as ThreshBoost (as in the previous embodiment), and, as before, it is preferably indicative of a minimum admitted quality of RS received by the UE and transmitted from the radio base stations 105 (and below which a boost of RS power is desirable, expected or required for improving the communications in the considered cell 107).

In the affirmative case (exit branch Y of decision block 415), i.e. the selected RSRQ percentile value is lower than the first RSRQ threshold value ThreshBoost, the RS power in the corresponding cell 107 is increased with respect to data power (i.e., the RS power is boosted; block 418) in order to optimize the performance with respect to the current channel state in the considered cell 107 and the indication of a time at which a last change to the RS power occurred (i.e., the lastRSpowerChange) associated with the corresponding cell 107 is updated at the current time instant.

Preferably, as discussed above, RS power in the cells 107 is increased with respect to data power by modifying at least one power parameter referred to a power of signals transmitted by the corresponding radio base stations 105. For example, at least one between parameters named $P_A$ and $P_B$ defined by the 3GPP standard (with particular reference to 3GPP TS 36.213, section 5.2 "Downlink power allocation") is exploited in order to modifying the ratio between transmitted RS power and transmitted data power, as discussed above.

Afterwards, if the method 400 for dynamically varying RS powers with respect to data powers is configured for monitoring the cells of the radio mobile network 100 and/or 200 in parallel, the monitoring of the KPIs is iterated returning to block 406. Conversely, if the method 400 for dynamically varying RS powers with respect to data powers is configured for serially monitoring the cells of the radio mobile network 100 and/or 200, a next cell to monitor is selected (at block 412) and the process returns to block 406 for monitoring the KPIs of a next cell.

Back to the decision block 415, in the negative case (exit branch N of decision block 415), i.e. the selected RSRQ percentile value is equal or higher than the first RSRQ threshold value ThreshBoost, the performance in the considered cell 107 would not be improved by boosting the RS power with respect to data power, and it is then checked (decision node 421) whether the value of the currently considered KPI (i.e., the selected RSRQ percentile value) is higher than a second RSRQ threshold value. The second RSRQ threshold value will be denoted as ThreshDeBoost (as in the previous embodiment). As before, the KPI values between the first ThreshBoost and second ThreshDeBoost KPI threshold values are preferably indicative of a quality of RS received by the UE and transmitted from said radio base station 105 deemed satisfactory (or satisfactory KPI values), thus the second KPI threshold value ThreshDeBoost is preferably indicative of a maximum admitted quality of RS received by the UE and transmitted from said radio base station 105 (and above which a de-boost of RS power can reasonably be carried out without that the communications in the considered cell 107 are expected to be compromised, i.e. with the resulting quality of RS that is expected to fall within the satisfactory KPI values).

In the affirmative case (exit branch Y of the decision block 421), i.e. the selected RSRQ percentile value is higher than the second RSRQ threshold value ThreshDeBoost, a check of the second KPI (e.g., the RSRP) is performed, i.e. it is then checked (decision block 427) whether a selected RSRP percentile value (e.g. 5% percentile) is higher than a RSRP threshold value. The RSRP threshold value will be denoted as ThreshMinCoverage, and is preferably indicative of a satisfactory power level of RS received by the UE and transmitted from the radio base stations 105 (and above which a de-boost of RS power is expected not to compromise the communications in the considered cell 107).

In the affirmative case (exit branch Y of the decision block 427), i.e. the selected RSRP percentile value is higher or equal than the RSRP threshold value ThreshMinCoverage, the RS power in the considered cell 107 is lowered with respect to data power (i.e., the RS power is de-boosted)—block 424) in order to optimize the performance with respect to the current channel state in the considered cell 107, and the indication of a time at which a last change to the RS power occurred (i.e., the lastRSpowerChange) associated with the corresponding cell 107 is updated at the current time instant.

Preferably, RS power in the cells 107 is lowered with respect to data power by modifying at least one power parameter referred to a power of signals transmitted by the corresponding radio base stations 105. Even more preferably, the at least one power parameter used for lowering the RS power with respect to data power is the same power parameter used for increasing it.

Again, in one embodiment of the invention, implemented in a LTE/LTE-A radio mobile network 100 and/or 200, at least one of the parameters $P_A$ and $P_B$ is adjusted in order to modify the RS power to a desired value with respect to data power.

Then, as discussed above, if the method 400 for dynamically varying RS powers with respect to data powers is configured for monitoring the cells of the radio mobile network 100 and/or 200 in parallel, the monitoring of the KPIs is iterated returning to block 406; conversely, if the method 400 for dynamically varying RS powers with respect to data powers is configured for serially monitoring the cells of the radio mobile network 100 and/or 200, a next cell to monitor is selected (at block 412 mentioned above) and the process returns to block 406 for monitoring the KPIs of a next cell.

Back to decision blocks 421 and 427, if the selected RSRQ percentile value is lower than the second RSRQ threshold value ThreshDeBoost (exit branch N of decision block 421) or if the selected RSRP percentile value is lower than the RSRP threshold value ThreshMinCoverage (exit branch N of the decision block 427), the RS power is considered to be already at an optimized value for a current channel state in the cell 107 (i.e. the communications in the considered cell 107 would be not improved by modifying the RS power) and no (boosting or de-boosting) action is taken. Thus, if the method 400 for dynamically varying RS powers with respect to data powers is configured for monitoring the cells of the radio mobile network 100 and/or 200 in parallel, the monitoring of the KPI is iterated returning to block 406. Conversely, if the method 400 for dynamically varying RS powers with respect to data powers is configured for serially monitoring the cells of the radio mobile network 100 and/or 200, a next cell to monitor is selected (at block 412 discussed above) and the process returns to block 406 for monitoring the KPIs of a next cell.

In another embodiment of the invention, a check of the second KPI (for example, the RSRP) can be performed also after comparing RSRQ against the first RSRQ threshold value ThreshBoost. Additionally or alternatively, different percentiles as reference for KPIs can be considered. Additionally or alternatively, further information may be exploited as KPIs instead of the RSRQ or RSRP, such as for example an average downlink throughput or the CQI (Channel Quality Indicator) reported by UE to respective radio base stations 105.

Moreover, additionally or alternatively to the cumulative distribution of the KPIs, one or more different statistical characterizations may be exploited for at least one of the involved KPIs, such as for example the average.

As should be readily understood, the generalizations cited above in connection with the method 300—and concerning, amongst other things, the different settings of the parameters $P_A$ and/or $P_B$ that can be used, the possibility of implementing an incremental approach for applying boosting and de-boosting of the RS power in the cells 107, the possibility of applying the method only to a group of cells or to just to one of the cells of the radio mobile network, the finer granularity with which the algorithm may be configured to modify the RS power, the possibility of providing a plurality of boosting and/or de-boosting values by exploiting the plurality allowed values of at least one of the parameters $P_A$ and/or $P_B$, the possibility of defining a plurality of boost KPI threshold values, the possibility of evaluating a percentage of decrease of a KPI below a boost KPI threshold value, the possibility of reducing the RS power to de-boosted RS power values lower than the base values ($P_{A|base}=0$ dB and $P_{B|base}=0$), the possibility of implementing a step, just after steps 418 and 424, devised to compensate coverage variations in order to prevent the UE from sensing a coverage variation, and the possibility of exploiting parameters used for managing a cell reselection operation (for example, the parameters named Qhyst and Qoffsets,n and the parameter named cellIndividualOffset)—may equivalently be applied to the method 400 as well.

In addition, although in the previous discussion explicit reference has been made to increasing the power of the Reference Signal if the current value of a first performance indicator (e.g., the Reference Signal Received Quality) is lower than a first threshold (e.g., the first KPI threshold value ThreshBoost), or decreasing the power of the Reference Signal if the current value of said first performance indicator is greater than a second threshold (e.g., the second KPI threshold value ThreshDeBoost) and, for the second embodiment, further if the current value of a second performance indicator (e.g., a Reference Signal Received Power) is equal to or higher than a third threshold (e.g., the RSRP threshold value ThreshMinCoverage), it is pointed out that the terms "higher" and "lower" exemplary used for defining the above conditions specifically depend on the selected performance indicator(s) and/or how the first and/or second performance indicators are defined. In view of that, modifying the proposed method, and/or the first, second and/or threshold values, such that said increasing the power of the Reference Signal is carried out if the current value of a first performance indicator (e.g., the Reference Signal Received Quality) crosses (i.e. trespasses from above or from below) the first threshold (e.g., the first KPI threshold value ThreshBoost) or said decreasing the power of the Reference Signal is carried out if the current value of said first performance indicator crosses (i.e., trespasses from above or from below) the second threshold (e.g., the second KPI threshold value ThreshDeBoost) and, for the second embodiment, further if the current value of a second performance indicator (e.g., a Reference Signal Received Power) crosses (i.e., trespasses from above or from below) the third threshold (e.g., the RSRP threshold value ThreshMinCoverage), is within the reach of the skilled person.

The invention claimed is:

1. A method of dynamically varying powers of Reference Signals irradiated by a plurality of radio base stations of a radio mobile network, said radio base stations providing communication services to User Equipment located in at least one of a plurality of respective cells served by said radio base stations, the method comprising:
   monitoring, by a network entity and in parallel for the respective cells, at least one performance indicator associated with the respective cells, said at least one performance indicator being indicative of communication channel states within said respective cells, and
   increasing or decreasing the power of the Reference Signals in the respective cells on the basis of a current value of said at least one performance indicator associated with each one of the respective cells, and on the basis of whether a time period from a last adjustment of the power of the Reference Signals in the respective cells is equal to or greater than a minimum time interval threshold,
   wherein said increasing or decreasing the power of the Reference Signals in the respective cells on the basis of a current value of said at least one performance indicator comprises modifying at least one power parameter referred to power of signals transmitted by said radio base stations.

2. The method according to claim 1, wherein the communication channel states include at least one complex transfer function matrix accounting for transmissions between one or more transmit antennas and one or more receive antennas of said radio base stations and User Equipment located in the respective cells.

3. The method according to claim 1, wherein the step of either increasing or decreasing the power of the Reference Signals in said respective cells on the basis of a current value of said at least one performance indicator comprises:
   increasing the power of the Reference Signals in said respective cells if said current value of said at least one performance indicator is lower than a first threshold, or
   decreasing the power of the Reference Signals in said respective cells if said current value of said at least one performance indicator is greater than a second threshold.

4. The method according to claim 3, wherein said at least one performance indicator associated with the respective cells comprises a Reference Signal Received Quality measurement.

5. The method according to claim 4, wherein said first and second thresholds are indicative, respectively, of minimum and maximum admitted qualities of Reference Signals received by the User Equipment and transmitted from said radio base stations.

6. The method according to claim 1, wherein said at least one performance indicator comprises a first and a second performance indicators, and wherein the step of either increasing or decreasing the power of the Reference Signals in said respective cells comprises:
increasing the power of the Reference Signals in said respective cells if the current value of said first performance indicator is lower than a first threshold, or
decreasing the power of the Reference Signals in said respective cells if the current value of said first performance indicator is greater than a second threshold and the current value of said second performance indicator is equal to or higher than a third threshold.

7. The method according to claim 6, wherein said first and second performance indicators associated with the respective cells comprise a Reference Signal Received Quality measurement and a Reference Signal Received Power measurement, respectively.

8. The method according to claim 7, wherein said first and second thresholds are indicative, respectively, of minimum and maximum admitted qualities of Reference Signals received by the User Equipment and transmitted from said radio base stations, and said third threshold is indicative of a satisfactory power level of Reference Signals received by the User Equipment and transmitted from said radio base stations.

9. The method according to claim 1, wherein said modifying at least one power parameter referred to power of signals transmitted by said radio base stations comprises:
modifying a power associated with Orthogonal Frequency-Division Multiplexing symbols transmitted from said radio base stations to said User Equipment.

10. The method according to claim 9, wherein said modifying a power associated with Orthogonal Frequency-Division Multiplexing symbols transmitted from said radio base stations to said User Equipment comprises:
modifying at least one between parameters $P_A$ and $P_B$ defined by the 3GPP standard.

11. The method according to claim 10, wherein said increasing the power of the Reference Signals in said respective cells if said current value of said at least one performance indicator is lower than a first threshold comprises:
modifying at least one between parameters $P_A$ and $P_B$ from a respective first value to a respective second value, the second value being lower than the first value in case of parameter $P_A$.

12. The method according to claim 11, wherein said modifying at least one between parameters $P_A$ and $P_B$ from a respective first value to a respective second value comprises:
modifying the parameters $P_A$ and $P_B$ from base values, equal to $P_{A|base}=0$ dB and $P_{B|base}=0$ (or 1), to boosted values, equal to $P_{A|boost}=-3$ dB and $P_{B|boost}=1$.

13. The method according to claim 11, wherein
for said parameter $P_A$ said first value, said second value, said third value, said fourth value are selected among 3 dB, 2 dB, 1 dB, 0 dB, −1.77 dB, −3 dB, −4.77 dB and −6 dB, and wherein
for said parameter $P_B$ said first value, said second value, said third value, said fourth value are selected among 0, 1, 2 and 3.

14. The method according to claim 10, wherein said decreasing the power of the Reference Signals in said respective cells if said current value of said at least one performance indicator is greater than a second threshold comprises:
modifying at least one between parameters $P_A$ and $P_B$ from a respective third value to a respective fourth value, the fourth value being higher than the third value in case of parameter $P_A$.

15. The method according to claim 14 when depending on claim 14, wherein said modifying at least one between parameters $P_A$ and $P_B$ from a respective third value to a respective fourth value, the fourth value being higher than the third value comprises:
modifying the parameters $P_A$ and $P_B$ from boosted values, equal to $P_{A|boost}=-3$ dB and $P_{B|boost}=1$, to base values, equal to $P_{A|base}=0$ dB and $P_{B|base}=0$ (or 1).

16. The method according to claim 10, further comprising:
determining a percentage of decrease of said current value of said at least one performance indicator below the first threshold, and
wherein said modifying at least one between parameters $P_A$ and $P_B$ comprises modifying at least one between parameters $P_A$ and $P_B$ on the basis of said percentage of decrease.

17. The method according to claim 10, further comprising:
determining a percentage of increase of said current value of said at least one performance indicator above the second threshold, and
wherein said modifying at least one between parameters $P_A$ and $P_B$ comprises modifying at least one between parameters $P_A$ and $P_B$ on the basis of said percentage of increase.

18. The method according to claim 1, further comprising:
adjusting at least one cell reselection parameter referred to said respective cells for compensating a variation of a geographic extension of said respective areas provoked by said either increasing or decreasing the power of the Reference Signals in said respective cells.

19. The method according to claim 18, wherein said adjusting at least one cell reselection parameter referred to said respective cells comprises adjusting at least one among:
parameter Qhyst;
parameter Ooffsets,n, and
parameter cellIndividualOffset which are defined by the 3GPP standard.

20. The method according to claim 19, wherein said adjusting comprises, when the power of the Reference Signals are increased, at least one among:
decreasing parameter Qhyst of the same amount of increase of the power of the Reference Signals;
increasing parameter Ooffsets,n of the same amount of increase of the power of the Reference Signals, and
decreasing parameter cellIndividualOffset of the same amount of increase of the power of the Reference Signals, and
when the power of the Reference Signals are decreased, at least one among:
increasing parameter Qhyst of the same amount of increase of the power of the Reference Signals;
decreasing parameter Ooffsets,n of the same amount of increase of the power of the Reference Signals, and
increasing parameter cellIndividualOffset of the same amount of increase of the power of the Reference Signals.

21. A system for dynamically varying powers of Reference Signals irradiated by a plurality of base stations of a radio mobile network, said radio base stations providing communication services to User Equipment located in at least one of a plurality of respective cells served by said radio base stations, the system comprising:
one or more network entities including a non-transitory computer-readable medium encoded with computer-readable instructions that cause the one or more network entities to perform a method according to claim 1.

22. The method according to claim 1, wherein the increasing or decreasing the power of the Reference Signals in the respective cells further comprises:
increasing or decreasing the power of the Reference Signals in the respective cells when the time period is equal to or greater than the minimum time interval threshold; and
maintaining the power of the Reference Signals in the respective cells when the time interval is less than the minimum time interval threshold.

* * * * *